(12) United States Patent
Sharma et al.

(10) Patent No.: US 10,104,704 B2
(45) Date of Patent: Oct. 16, 2018

(54) DYNAMIC ACCELERATION OF PRIORITIZED MOBILE APPLICATION TRAFFIC

(71) Applicant: Cisco Technology, Inc., San Jose, CA (US)

(72) Inventors: Shivangi Sharma, Los Gatos, CA (US); Daniel G. Wing, San Jose, CA (US); Parameswaran Kumarasamy, Bangalore (IN); Parag Pritam Thakore, Los Gatos, CA (US); Anand Oswal, Pleasanton, CA (US); Vamsidhar Valluri, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 158 days.

(21) Appl. No.: 14/175,079

(22) Filed: Feb. 7, 2014

(65) Prior Publication Data
US 2015/0230274 A1    Aug. 13, 2015

(51) Int. Cl.
*H04W 76/12*    (2018.01)
*H04W 76/02*    (2009.01)
*H04W 72/12*    (2009.01)

(52) U.S. Cl.
CPC ......... *H04W 76/12* (2018.02); *H04W 76/022* (2013.01); *H04W 72/1242* (2013.01)

(58) Field of Classification Search
None
See application file for complete search history.

(56) References Cited

U.S. PATENT DOCUMENTS

| | | | |
|---|---|---|---|
| 2007/0195797 A1* | 8/2007 | Patel | H04J 3/0685 370/400 |
| 2008/0186897 A1* | 8/2008 | Rune | H04L 12/4633 370/315 |
| 2009/0052466 A1* | 2/2009 | Khalid | H04L 45/00 370/467 |
| 2010/0238839 A1* | 9/2010 | Batteram | H04L 29/06027 370/254 |
| 2013/0103791 A1* | 4/2013 | Gottdenker | H04L 67/02 709/217 |
| 2016/0036704 A1* | 2/2016 | Xiao | H04L 47/2416 370/237 |

* cited by examiner

*Primary Examiner* — Christopher Crutchfield
*Assistant Examiner* — Alan Lindenbaum
(74) *Attorney, Agent, or Firm* — Patterson + Sheridan, LLP

(57) ABSTRACT

In one embodiment, a method for the prioritized transmission of messages includes monitoring a network link of a mobile device to determine performance characteristics of the network link, establishing a network association between the mobile device and a routing network node, receiving a connection request from an application that is directed to a connection between the mobile device and a destination server, determining a relative priority of the connection, mapping the connection to a stream of the network association that is associated with the relative priority of the connection and identifies the destination server, and transmitting messages for the stream to the routing network node interlaced with messages of other streams of the network association based on the performance characteristics of the network link and the relative priority associated with the stream in comparison to relative priorities associated with the other streams of the network association.

28 Claims, 10 Drawing Sheets

DYNAMIC ACCELERATION OF PRIORITIZED MOBILE APPLICATION TRAFFIC

TECHNICAL FIELD OF THE DISCLOSURE

The present disclosure relates generally to a system and method for providing prioritized flows of traffic in a telecommunications network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology.

The efficient use of wireless network bandwidth is an important issue in wireless network design. This is especially true as a greater number of users begin to make us of these networks and as they are used both for personal and business purposes. As mobile devices with increased performance and capacity become available, applications will be developed that continue to increase the demand for network resources. Providing appropriate levels of latency and error rates for these application is important for maintaining user satisfaction with the network.

DESCRIPTION OF EXAMPLE EMBODIMENTS

Overview

Figure 1:
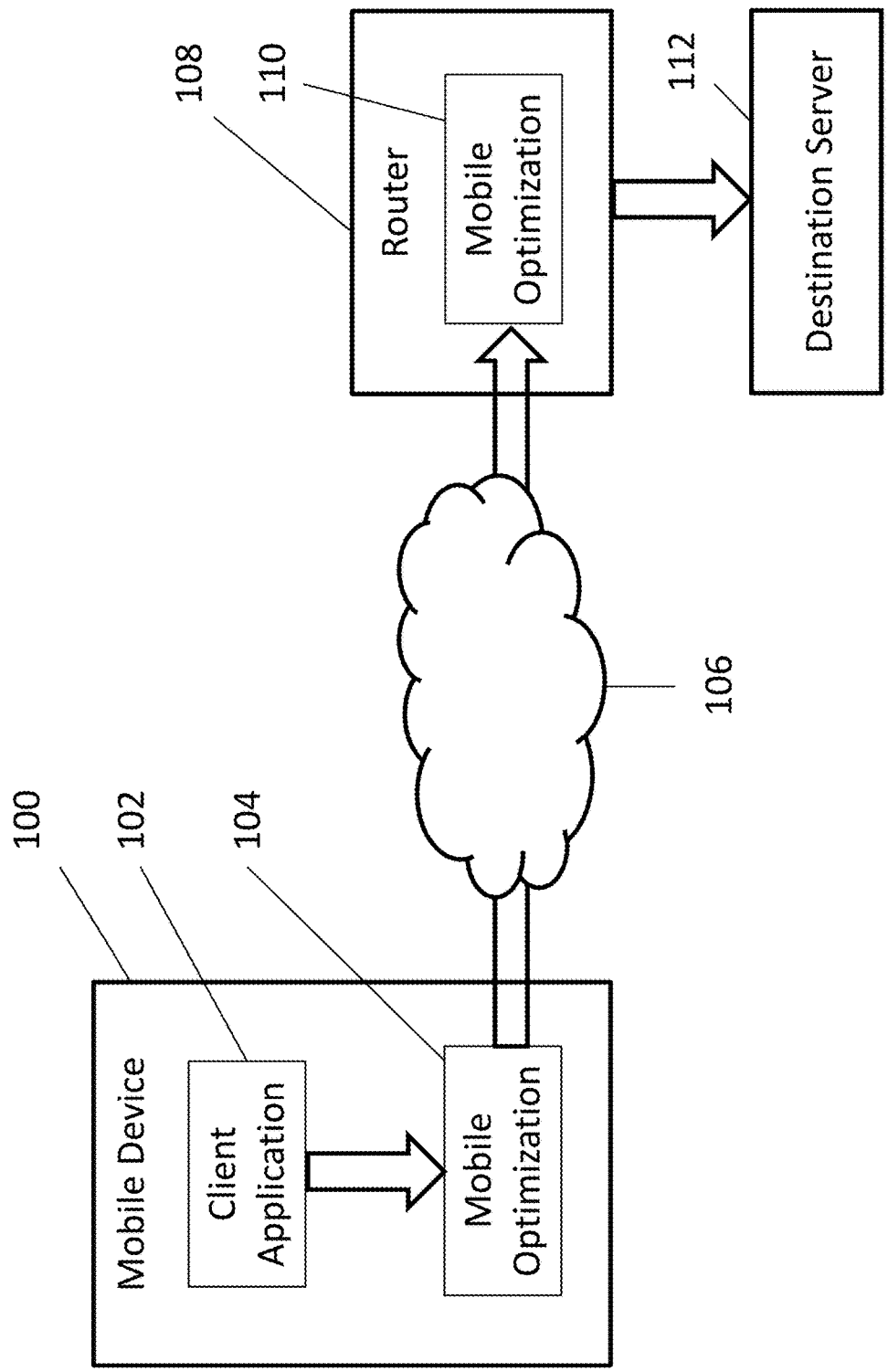
FIG. 1 illustrates a communication network topology, in accordance with some embodiments.

Certain embodiments disclose a method for the prioritized transmission of messages that comprises monitoring a network link of a mobile device to determine performance characteristics of the network link, using the network link, establishing a network association between the mobile device and a routing network node, receiving a connection request from an application of the mobile device, wherein the connection request is directed to a connection between the mobile device and a destination server accessible via the network link, determining a relative priority of the connection, mapping the connection to a stream of the network association, wherein the stream is associated with the relative priority of the connection and identifies the destination server, and transmitting messages for the stream to the routing network node, wherein the network association interlaces messages from the stream with messages of other streams of the network association based on the performance characteristics of the network link and the relative priority associated with the stream in comparison to relative priorities associated with the other streams of the network association.

Example Embodiments

This disclosure relates generally to determining the priority of connections initiated by mobile applications to provide flow control and congestion control over a network link (e.g., a wireless 3G, 4G, or WiFi connection). This disclosure further relates to monitoring network link characteristics such as error rate and latency to provide these types of control. Mobile devices making use of these networks, such as smartphones, cell phones, and data-cards, have continued to proliferate at a rapid pace. Businesses allowing their employees to use their personal devices for business purposes has contributed to this proliferation. At the same time, the sophistication of these devices has increased. Many applications beyond simple phone calls and text messaging are made possible by these new devices and the networks that serve them. As the number of applications has increased, users are running more applications simultaneously. These applications, which compete for network resources and contribute to network congestion, include web browsing, use of the file transfer protocol (FTP), streaming video, audio- or video-conferencing, screen-sharing, and conducting financial transactions.

In many cases, these applications are designed to use the Transmission Control Protocol (TCP) as a transport protocol. However, TCP was designed for the wireline systems having relatively low error rates and high bandwidth. In contrast, wireless networks are often impaired by environmental conditions, terrestrial obstructions, interference, reflection, handoffs and others conditions that may lead to unpredictable error rates and latency. Such adverse conditions and unpredictably may lead to poor or reduced application performance.

In some embodiments, each application may request and use one or more TCP connections. Each TCP connection of each application operating on a mobile device may operate independently of each other. In doing so, each TCP connection may probe the network to determine available bandwidth and transmit at a maximum available or high rate. Transmitting at these rates may resulting in inefficient use of bandwidth resources because it does not considering the network link characteristics (e.g., error rate and latency associated with a wireless network link) For more efficient use of the network link, it is useful to consider the mobile device as a whole, to understands the priority of each application or each connection of an application (or even each message of each connection of an application), and to understand the network link characteristics. By doing so, it is possible to provide differentiated services in the transport layer so that wireless link resources are efficiently utilized based on the application requirements.

For example, an individual TCP connection may enter a slow start mode when it detects packet loss. By entering this mode, the TCP protocol assumes that the packet loss occurs because of congestion in the network (e.g., multiple devices may be contending for resources, which may cause network devices like routers or switches to run out of resources and thus drop packets). When using the TCP protocol with wireless links, however, packet loss may alternatively be caused by interference, signal variations or other characteristics of the wireless connection. To properly handle the different possible causes of packet loss, it is important for wireless devices to distinguish between congestion and other possible causes of packet loss (e.g., including issues related to connecting over a wireless link). If packet loss issues are not distinguished in this way, TCP connections originating on a wireless mobile device may unnecessarily enter the slow start mode and under-utilize the available wireless link bandwidth. For example, if it is determined that packet loss is caused by wireless link issues, a high sending rate may be maintained (e.g., by not entering a slow start mode). To distinguish between these possible causes, network conditions may be monitored using feedback from other network devices to determine whether packet losses are caused by wireless link issues or by network congestion. Furthermore, by monitoring network conditions, the overall bandwidth available to the mobile device in the wireless network may be determined and distributed across the applications that use network resources (e.g., as opposed to each TCP stream individually attempting to detect network conditions and determining its transmission rate). In this way, efficient flow control and congestion control may be implemented to provide differentiated services to the mobile device.

One solution is to map the TCP connections created by applications to alternative connection types that can be managed in combination (i.e., considered and managed as a whole, rather than each managed individually). In some embodiments, each TCP connection can be mapped to a Stream Control Transmission Protocol (SCTP) stream. Overall flow and congestion control may then be provided for each of these SCTP streams using one or more SCTP associations established between the mobile device and a headend network device. In these embodiments, each SCTP association controls the ordering of messages carried by each SCTP stream in an organized manner as opposed to each TCP connection individually competing for network link resources. This arrangement provides an opportunity for improved flow control and congestion control for messages carried using the network link of the mobile device.

To provide such flow control and congestion control, each TCP connection created by an application may be mapped to a prioritized SCTP stream. Each such SCTP stream may be assigned a priority based on the nature of the application that created the TCP connection. Individual messages transmitted by an application may also be mapped to SCTP streams of a corresponding priority. This mapping may be dynamically determined by the mobile device, controlled by the application itself, configured by the user of the mobile device, or configured by a network administrator (e.g., in the case of a user using his or her own mobile device to access enterprise applications that are controlled by the network administrator). In some embodiments, individual messages of a TCP connection may be categorized, with each category being mapped to a different SCTP stream of a corresponding priority.

The type of application creating a TCP connection for which an SCTP stream is to be created may be determined in a variety of ways. For example, application type of a given application may be identified by the use of specific or pre-defined ports by that application, by the destination addresses to which the application is transmitting, by configured application profiles, by hostname or Uniform Resource Identifier (URI) for Hypertext Transfer Protocol (HTTP) connections, by specialized Application Programming Interfaces (APIs) through which applications interface with the wireless link, or by policies provided by a network administrator (e.g., from an enterprise server in communications with a mobile device). Once the application type of a given application is determined, a corresponding priority may be assigned based on that type. Specific applications may also have corresponding priority. For example, if an application is determined to be for conducting time-sensitive financial transactions, then streams created for that application may be a given relatively high priority. In another example, a user may designate a particular application as having a particularly high priority. In this case, once that application is identified as the particular application for which a user designated a priority, it streams created for that application can be assigned this priority.

Additionally, the specific communication protocols used by an application or connections of that application, if known, may be parsed to determine an appropriate priority for streams that will carrying the corresponding traffic. For example, some web browsers may create multiple TCP connections to simultaneously access resources from one or more domains that are used to display a web page. However, web browsers that make use of the SPDY protocol may create multiple SPDY streams for the various HTTP requests involved in access a given website. The TCP connections created for accessing the website resources may then be mapped to SPDY streams and assigned relative priorities. In this case, the browser may use the SPDY protocol to format messages carried by a TCP connection and may transmit SPDY protocol control messages using that connection. These control messages may carry priority information that can be extracted and used for determining priority when mapping the connections of such an application to an SCTP stream or streams.

To provide improved flow control and congestion control for such streams (e.g., SCTP streams), the mobile device may monitor its network link characteristics. This monitoring is useful when the mobile device uses a wireless link, which is generally more susceptible to degradations and variations in performance than a wired link. To better react to changing network conditions, network characteristics may be periodically, frequently, or constantly monitored. Such monitoring is possible, for example, by analyzing packet transmission characteristics, by sending active probe messages for testing current network conditions, or by receiving input from a network node such as a headend or virtual private network (VPN) router (e.g., a cloud services router). For example, if it is determined that the network is performing poorly, then flow control and congestion control algorithms operating on the mobile device may give precedence to streams for high priority applications or streams for high priority messages sent by applications.

In some embodiments, there may be a one-to-one mapping between TCP and SCTP streams. In other embodiments, data for multiple TCP connections may be mapped to a single SCTP stream and separated by delimiters. Such mapping may provide additional bandwidth savings if messages carried by that single stream are compressed prior to transmission. In other embodiments, one TCP connection may be mapped to multiple SCTP streams. For example, in the case of multiple SPDY streams being carried over a single TCP connection, an SCTP stream may be allocated for each SPDY stream of that connection. In another example, the mobile device may determine categories of messages carried by a single TCP connection and map each category to a separate SCTP stream.

Advantages of mapping application connections to centrally-managed and prioritized streams can include one or more of improved productivity when using mobile devices for business purposes (including cases where users use their own devices for business purposes), improved user experience as a result of accelerated data delivery for applications with prioritized streams, improved support for critical applications by allowing increased use of network link resource relative to other applications, reduced impact of adverse or unpredictable network characteristics on applications using TCP connections, and efficient use of network bandwidth.

FIG. 1 illustrates a network diagram in accordance with some embodiments. The network diagram of FIG. 1 includes mobile device 100, network 106, router 108, and destination server 112. Mobile device 100 further includes client application 102 and client mobile optimization module 104. Router 108 further includes server mobile optimization module 110.

Mobile device 100 may be a smartphone, laptop, tablet, or other device that is capable of accessing a wireless network. Mobile device includes at least one client application 102, such as a web browser, an FTP client, an audio or video-streaming application, or an online banking application. Some client applications may require access to a destination server 112, such a corporate email or file-sharing application requiring access to a corporate server. To communicate over the network with network nodes such as destination server 112, client application creates one or more connections. In some embodiments, these connections may be TCP connections.

Each connection created by client application 102 may be detected by client mobile optimization module 104. Client application 102 may be specifically designed to direct requests for connections to client mobile optimization module 104. Alternatively, client mobile optimization module 104 may independently monitor and intercept requests for connections issued by client application 102. Client mobile optimization module 104 may more generally monitor all traffic flows from mobile device and map these flows to prioritized streams. In these cases, client application 102 does not need to be configured with any details of client mobile optimization module 104, or even necessarily be developed with knowledge of the client mobile optimization module 104. Note that the "optimization" modules do not "optimize" in some absolute sense, but come to a desirable outcome based on various parameters as described herein.

Client mobile optimization module 104 may determine the relative priority of each connection request. In some embodiments, the particular application or type of application making a request may be identified by use of a regular expression that matches a destination hostname or URI. For example, a request to a hostname matching the regular expression "youtube" may be attributed to a YouTube application or more generally classified as a request for streaming video. Similarly, a request to a URI matching the regular expression "http://bank.com" may be classified as a request for a financial transaction. Once an application or type of application that has requested a connection has been determined, it may be dynamically mapped to a stream with a corresponding priority. In some embodiments, these streams may be SCTP streams. Each such connection may be managed by the client mobile optimization module 104. Client mobile optimization module 104 may combine each stream into a single association that is used to manage communications with router 108. This single association may be an SCTP association. Thus, multiple applications executing on mobile device 100 may each creates TCP multiple connections, each of which is mapped to an SCTP stream, all of which are managed by a single SCTP association. Using this single SCTP association, the client mobile optimization module 104 applies flow control and congestion control to each of these streams. For example, client mobile optimization module 104 may re-order or interlace the transmission of packets that it receives from each stream so that relatively higher priority applications receive preferential access to network bandwidth.

Mobile device 100 communicates with router 108 through network 106. Network 106 may be a wireless network such as a 3G, 4G, or WiFi network. The network association for flow control and congestion control established by the client mobile optimization module 104 may communicate with the server mobile optimization module 110 of router 108. Client mobile optimization module 104 may pre-establish an association with server mobile optimization module 110 so that future dynamically-mapped streams may be carried using this association. For example, client mobile optimization module 104 may pre-establish an SCTP association with server mobile optimization module 110 upon connecting to the network 106. Multiple network associations may be established between mobile device 100 and router 108, and mobile device 100 may also establish additional network associations for managing flow control and congestion control with other network nodes or additional routers.

In the case of streams created for multiple applications or connections with differing priorities, bandwidth resources may be utilized such that streams with a higher priority may be allocated more network 106 resources or earlier access to network 106 resources than other low priority streams. Streams for higher priority applications may be allocated an even greater proportion of network 106 resources during periods of network issues, such as periods of high latency or high error rate. A key aspect of the present disclosure is that the network usage of mobile device 100 may be considered and managed as a whole, rather than on a connection-by-connection basis. This may prevent or reduce scenarios where connections compete equally for network resources even if some connections are of much greater importance to the mobile device user. For example, a mobile device user who initiates a financial transaction would likely prefer connections associated with that transaction to be given precedence over connections created for games or background updating of applications. Flow control (e.g., prioritizing packets or messages for higher priority streams) and congestion control (e.g., adjusting the proportion of network resources allocated to higher priority streams) are important for avoiding such undesirable scenarios.

Client mobile optimization module 104 may also monitor characteristics of network 106 and adjust flow control and congestion control based on these characteristics. Client mobile optimization module 104 may independently probe characteristics such as network latency or error rate, or it may receive characteristics in messages received from the network (e.g., from server mobile optimization module 110). In this way, the client and server mobile optimization modules may co-operate to generate input for the client's flow control and congestion control.

Mobile device 100 and router 108 may continue to exchange messages regarding network 106 conditions as stream data is transmitted over network 106. For example, if mobile device 100 is experiencing significant latency, router 108 may be informed of this condition by the mobile device 100. Alternatively, router 108 may independently detect this condition. In either of these cases, router 108 may slow the rate at which it transmits stream data to mobile device 100 such that mobile device is not overwhelmed. This situation may occur if a mobile device establishes connection over a high-bandwidth 4G link but then later roams to a slower 2G link. Similarly, the mobile device 100 may also inform the router 108 of changing network conditions such as available bandwidth, packet loss, or current connection type (e.g., 3G, 4G, or WiFi). Router 108, upon learning of these conditions, may act accordingly (e.g., by slowing down transmissions or giving higher priority streams increased precedence).

Network traffic generated by the connections of client application 102 from mobile device 100 thus arrive at router 108 as data carried by one or more prioritized streams created for that connection. Each such prioritized stream may be managed by one or more networks associations (e.g., SCTP associations) established between the client and server mobile optimization modules 104 and 110. For each connection created by client application 102, server mobile optimization module 110 creates a corresponding connection from router 108 to a destination server 112. Thus, if client application 102 requested a TCP connection to a given destination server 112, server mobile optimization module 110 creates a TCP connection from router 108 to by corporate server 12. Data passed from client application 102 would thus pass from mobile device 100 to router 108 in a prioritized fashion using a network association established between these network entities, and then from router 108 to destination server 112 using the separate connection established between router 108 and destination server 112. Similarly, data passed from destination server 112 to router 108 would pass from router 108 to mobile device 100 using the same network association. This arrangement allows important applications prioritized access to network resources through the association, while the connections between router 108 and the destination server 112 allow the destination server to operate without knowledge of the prioritized traffic scheme. This arrangement is important for efficient use of network resources between the mobile device 100 and the router 108, especially when the network conditions are unfavorable (e.g., when accessing a network wirelessly from a hotel lobby or airport).

Transporting data between mobile device 100 and router 108 using prioritized streams of a single network association established between mobile device 100 and router 108 allows traffic for higher priority application to be given precedence over lower priority applications. Additional efficiency is possible if traffic sent by client application 102 is also compressed by client mobile optimization module 104 prior to transmission over network 106 to router 108. In this case, server mobile optimization module 110 would then decompress the data before transmitting it to destination server 112. An advantage of this arrangement is that client application 102 may communicate with destination server 112 without any knowledge of this compression scheme, while network 106 resources are nonetheless conserved by the compression. Even if client application 102 and destination server 112 implemented their own compression for a connection, additional bandwidth savings may be obtained by compressing the data for that connection along with data from other unrelated connection using the network association between mobile device 100 and router 108.

Mobile device 100 may include a VPN client. Client mobile optimization module 104 may operate in conjunction with the VPN client or even be implemented as part of the VPN client. Router 108 may be a router designated for providing VPN access to a private network over the Internet or other public network. For example, router 108 may be a cellular gateway such as a packet gateway (PGW), a gateway GPRS support node (GGSN), or another network node where wireless data from mobile device converges. In embodiments that do not make use of VPN, the client may dynamically detect a router 108 or other headend server with which it is able to establish a network association for the transmission of prioritized stream data. In these and other embodiments, it is advantageous for router 108 to be located close (e.g., in terms of network round-trip-time) to destination server 112. In this way, the prioritized streams managed by client and server mobile optimization modules provide improved communication over a large portion of the total network path between mobile device 100 and destination server 112.

In some embodiments, the relative priority of client applications may be specified by a VPN administrator. In this way, the performance of enterprise application running over the VPN may be optimized. For example, a corporate VPN administrator may assign high priorities to applications with important or time-sensitive business purposes. This administrator may also assign other types of traffic lower priority, such as web browsing outside of corporate webpages. These configurations may be pushed to the mobile device 100 from router 108 or another source in the network. This priority information may be combined with other default or user-configured priority information for these and other applications.

Figure 2:
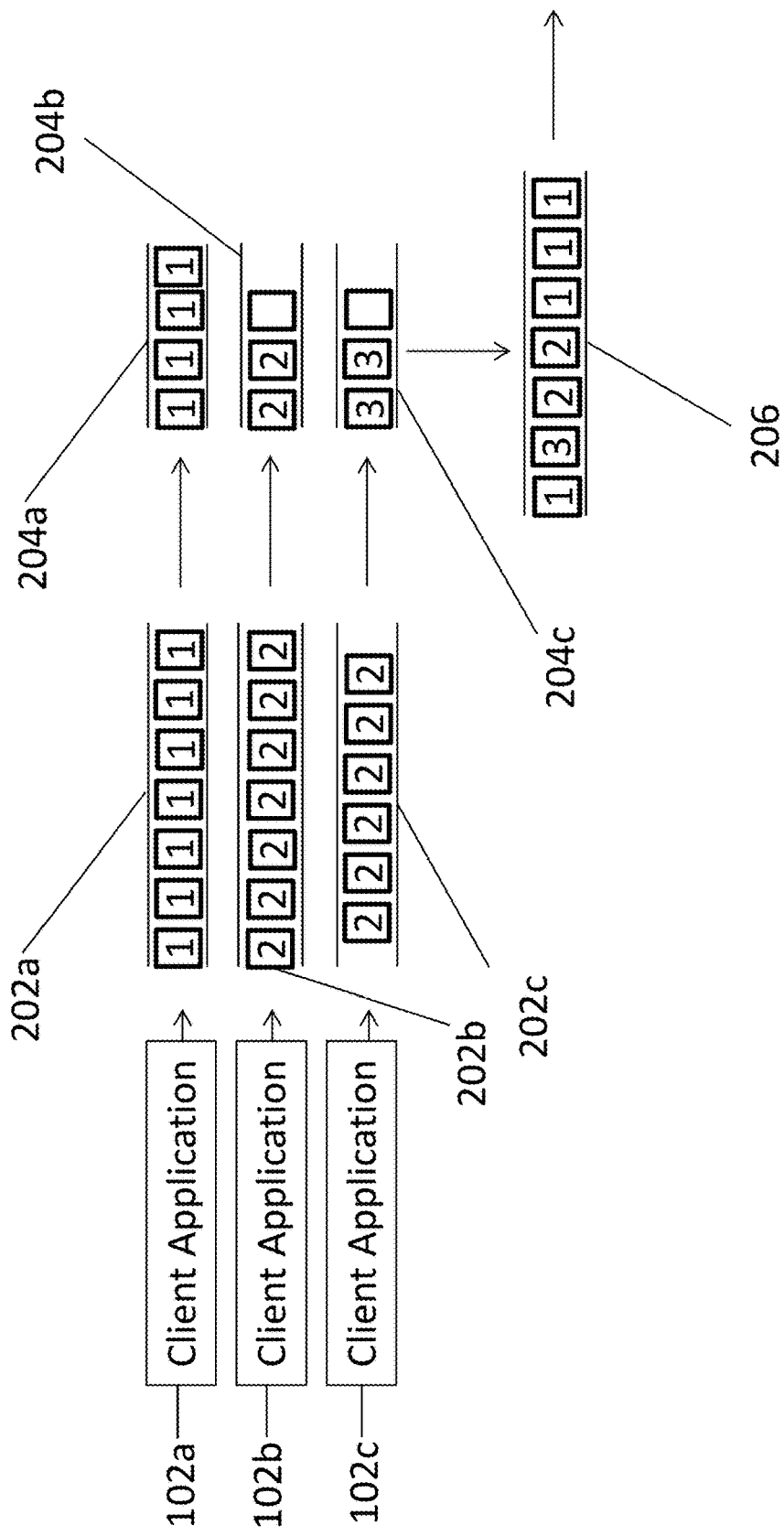
FIG. 2 illustrates a prioritized flow of packets originating from several examples of client applications, in accordance with some embodiments.

FIG. 2 illustrates an example relationship between connections created by client application 102, prioritized streams mapped to those connections by client mobile optimization module 104, and the single association between mobile device 100 and router 108 for managing data carried by each prioritized stream. FIG. 2 illustrates client applications 102a-102c, client application connections 202a-202c, corresponding prioritized streams 204a-204c, and a network association 206. Each of the numbered boxes illustrated within the connections 202a-202c, prioritized streams 204a-204c, and network association 206 represents an individual message or packet. The number within each message or packet represents a relative priority of that message or packet.

In the example of FIG. 2, each of client applications 102a-102c has established a corresponding network connection 202a-202c. Client application 102a may have designated its connection as relatively high priority, while client applications 102b and 102c may have designated their connections as relatively low priority. Thus, the messages or packets within client connection 202a are illustrated with a high priority and the message or packets within client connections 202b and 202c are illustrated with lower priorities.

Each connection 202a-202c is mapped by client mobile optimization module 104 to a corresponding stream 204a-204c. Upon creation of each stream 204a-204c, a corresponding priority is determined by taking into account the relatively priority specified by each application (e.g., by interpreting a known protocol used by each application), by identifying the applications (or type of application), or by a combination of these factors. In the example of FIG. 2, stream 204a is assigned the highest priority, stream 204b is assigned the second highest priority, and stream 204c is assigned the lower priority. In this example, client application 102a may be identified as a video streaming application that is sensitive to delay, client application 102b may be identified as a financial transaction application, and client application 102c may be identified as a web browser making a request for an entertainment website.

The messages carried by client connection 202a are passed to stream 204a. Because stream 204a was assigned the highest priority in this example, the messages or packets carried by stream 204a are illustrated with the highest priority among the streams. Similarly, because stream 204b was assigned the second highest priority in this example, the messages of packets carried by stream 204b are illustrated with the second highest priority among the streams. Finally, because stream 204c was assigned the lowest priority in this example, the messages or packets carried by stream 204c are illustrated with the lower priority among the streams. The priorities assigned to the messages or packets of each stream are used to govern the order in which packets from those streams are interlaced and transmitted by the network association 206. In this way, the priorities assigned to each stream by client mobile optimization module may override any priority determined by the creating application (although the priority determined by the application may be taken into account when determining stream priority).

Taking into account the priority assigned to each message or packet of each stream, client mobile optimization module selects an order in which to transmit these messages or packets. In the example of FIG. 2, three packets from the highest priority stream 204a are transmitted first, then two packets from the second high priority stream 204b, then a single packet from the lowest priority stream 204c, followed by another packet from the highest priority stream 204a. The order of transmission may be different if the relative priorities of the streams were different, or if the network conditions were different. For example, under conditions of extreme or increased network latency, four packets from highest priority stream 204a may be transmitted prior to transmitting any packets from relatively lower priority streams 204b and 204c.

Figure 3:
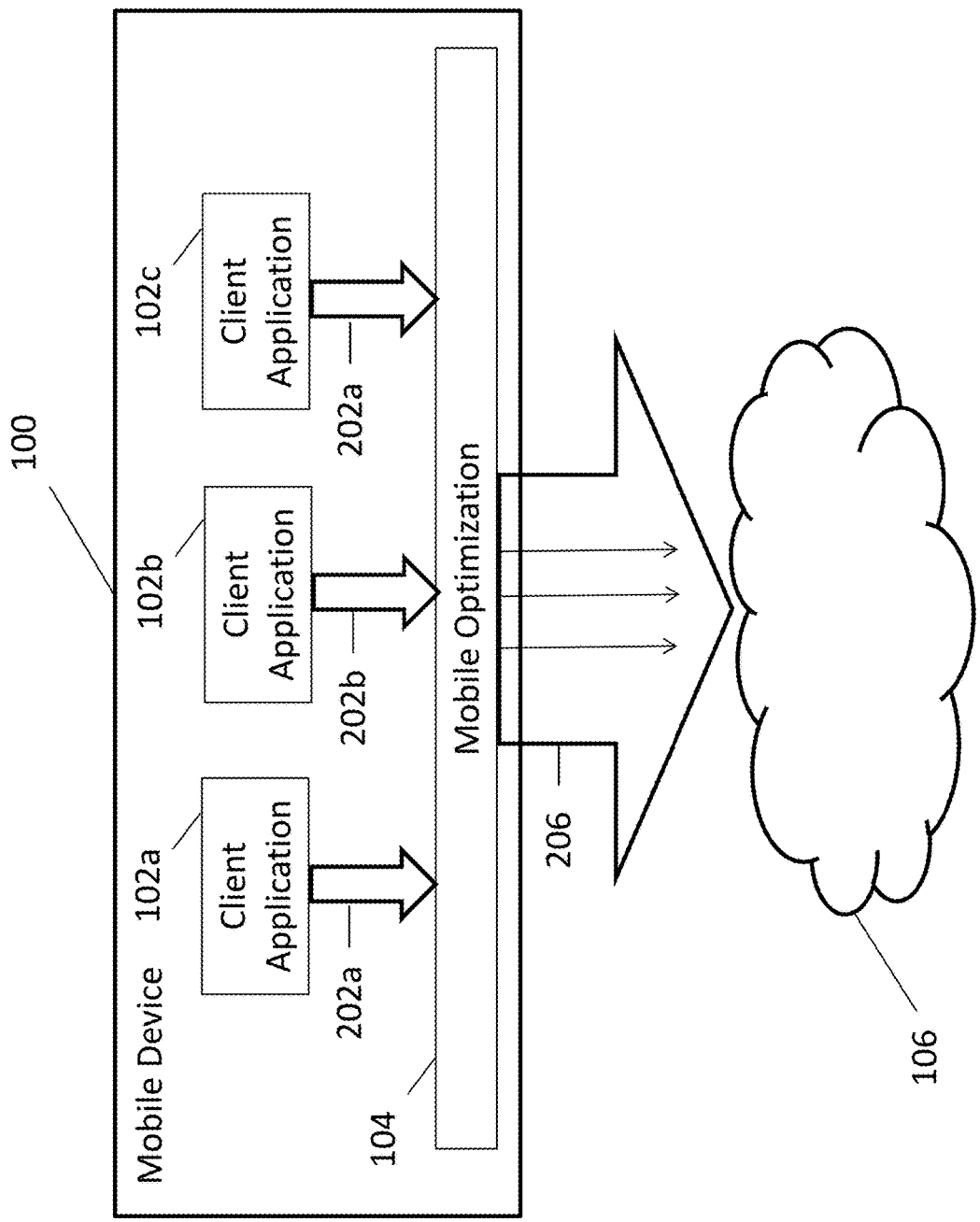
FIG. 3 illustrates an example relationship between several client applications and a single network association, in accordance with some embodiments.

FIG. 3 illustrates an example relationship between the individual connections created by client applications of a mobile device and the single association used to transmit data for those connections, in accordance with some embodiments. FIG. 3 includes mobile device 100, client applications 102a-102c, client mobile optimization module 104, network 106, client applications connections 202a-202c, and network association 206.

As in the example of FIG. 2, each of the client applications 102a-102c may create a corresponding client application connections 202a-202c. Each of these connections is managed by client mobile optimization module 104, which executes locally on mobile device 100. Client mobile optimization module 104 dynamically maps each client application connection 202a-202c to one or more prioritized streams of network association 206. Traffic originating from or addressed to client applications 102a-102c corresponding to client application connections 202a-202c travels through network 106 using the network association 206. This traffic may be interlaced as described above. In some embodiments, each client application connection may be a TCP connection, each prioritized stream of network association 206 may be an SCTP stream, and the network association 206 may be an SCTP association. This SCTP association may be established with a headend network entity such as a router (e.g., a CISCO cloud services router).

Figure 4:
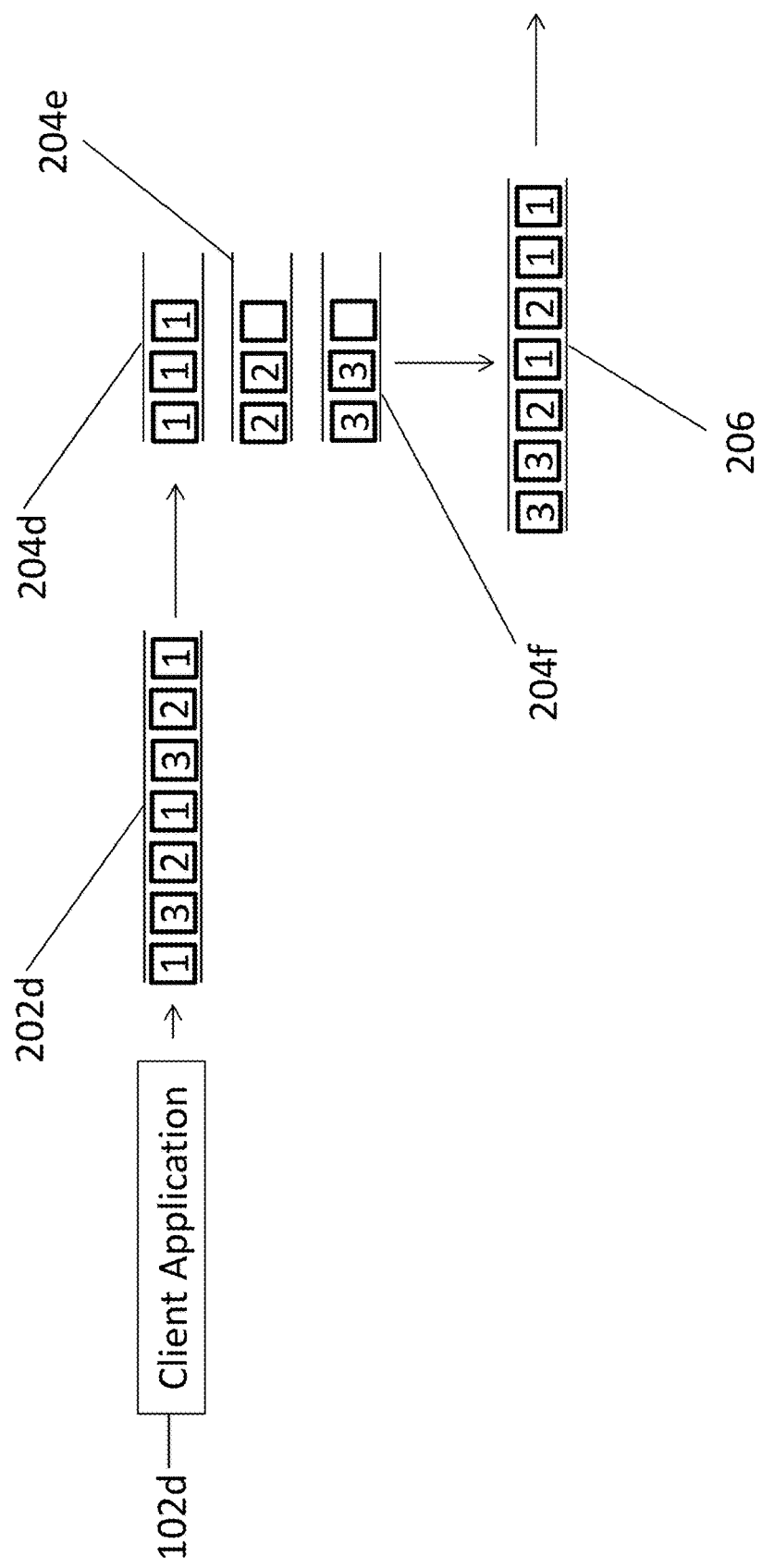
FIG. 4 illustrates the prioritized flow of packets originating from several streams of a single example client application, in accordance with some embodiments.

FIG. 4 illustrates an example relationship between a connection created by client application 102d having messages of varying priorities, prioritized streams mapped to those messages by client mobile optimization module 104, and the network association established between mobile device 100 and router 108 for managing data carried by each prioritized stream, in accordance with some embodiments. FIG. 4 illustrates client application 102d, client application connection 202d, corresponding prioritized streams 204d-204f, and a network association 206. Each of the numbered boxes illustrated within the connection 202d, prioritized streams 204d-204f, and network association 206 represents an individual message or packet. The number within each message or packet represents a relative priority of that message or packet.

Individual client application 102d may transmit messages or streams of messages with varying priorities. For example, a web browser may use the SPDY protocol to modify HTTP requests with assigned priorities. In this case, the web browser may recognize that a user has initiated three HTTP requests, with one being directed to a financial transaction, another to view a corporate webpage, and a third to view an entertainment webpage. This web browser may then modify the HTTP requests using the SPDY protocol to assign the financial transaction the highest priority, the corporate webpage request the second highest priority, and the entertainment webpage request the lowest priority. In another example, content acquisition streams can be controlled separately from streaming video streams. Additional logic may also be introduced in the transport layer to improve the flow of particular stream types. For example, by providing logic at the transport layer to prioritize the transmission of SPDY streams, a web browser may download the relatively more important resources used by a webpage ahead of other less important resources if there are wireless link or other network issues. Co-ordinating the retrieval of resources in this way may improve the experience of a user viewing a website using this browser. Alternatively, packets originating on the mobile device may be marked with a priority that is to be honored by other network devices, thereby providing an additional quality of service (QoS) for specific applications.

The SPDY protocol operates by dividing multiple HTTP requests into separate SPDY streams. A web server with knowledge of the SPDY protocol order its responses to these requests based on the corresponding priorities. However, if SPDY messages are carried across the network by individual TCP connections, several drawbacks remain. For example, network bandwidth may be used more efficiently if SPDY or TCP control frames (e.g., for adjusting TCP window size) are delivered quickly, but these messages may be delayed by messages for other TCP connections. Also, network latency or packet loss can result in buffering issues if a slow TCP connection stops reading from its buffer. In order to prevent or reduce the likelihood of one such slow connection from preventing other streams in the SPDY session from making progress, per-stream flow control may be used. Also, rate asymmetry (e.g., differences in server upload and download times) or differences in round-trip time may be more efficiently addressed when each SPDY stream is managed in combination with others.

For example, client mobile optimization module 104 may recognize the priorities assigned to each message or stream created by client application 102d. For example, client mobile optimization module 104 may parse messages sent by TCP connections using knowledge of the SPDY protocol to determine if each message is formatted using this protocol and, if so, to extract the SPDY priority. This priority information can then be used to dynamically map messages or streams created by client application 102d to prioritized streams 204d-204e. In some embodiments, SPDY streams created by client application 102d may be mapped to SCTP streams. In this case, the priority of each SCTP stream may be based on the priority assigned to each corresponding SPDY stream. Having created prioritized streams 204d-204e, client mobile optimization module 104 may then re-order messages carried by these prioritized streams and consume network bandwidth based on the priorities. One or more SPDY streams may be mapped to a single SCTP stream based on shaving similar priorities. Other common characteristics may also be used to map groups of SPDY streams or messages of a TCP connection to a single SCTP stream. Managing the messages and streams created by client application 102d in this way allows the priority assigned by the application (e.g., using the SPDY protocol) to be leveraged even if the destination web server does not implement the SPDY protocol. In this case, messages carried over network association 206 may be prioritized and then mapped back to standard TCP connections by server mobile optimization module 110 of router 108.

Taking into account the priority assigned to each message or packet of each stream, client mobile optimization module may select an order in which to transmit these messages or packets. In the example of FIG. 4, two packets from the highest priority stream 204d (e.g., corresponding to a SPDY request for a financial transaction) are transmitted first, then one packet from the second high priority stream 204e (e.g., corresponding to a SPDY request for a corporate webpage), then another packet from the highest priority streams 204d, then another packet from the second highest priority stream 204e, and finally two packets from the lowest priority stream 204f (e.g., corresponding to a SPDY request for an entertainment webpage). The messages of each stream may be interlaced differently if the relative priorities of the streams were different, or if the network conditions were different. For example, under conditions of extreme or increased network latency, three packets from highest priority stream 204d may be transmitted prior to any packets from relatively lower priority streams 204e and 204f.

Figure 5:
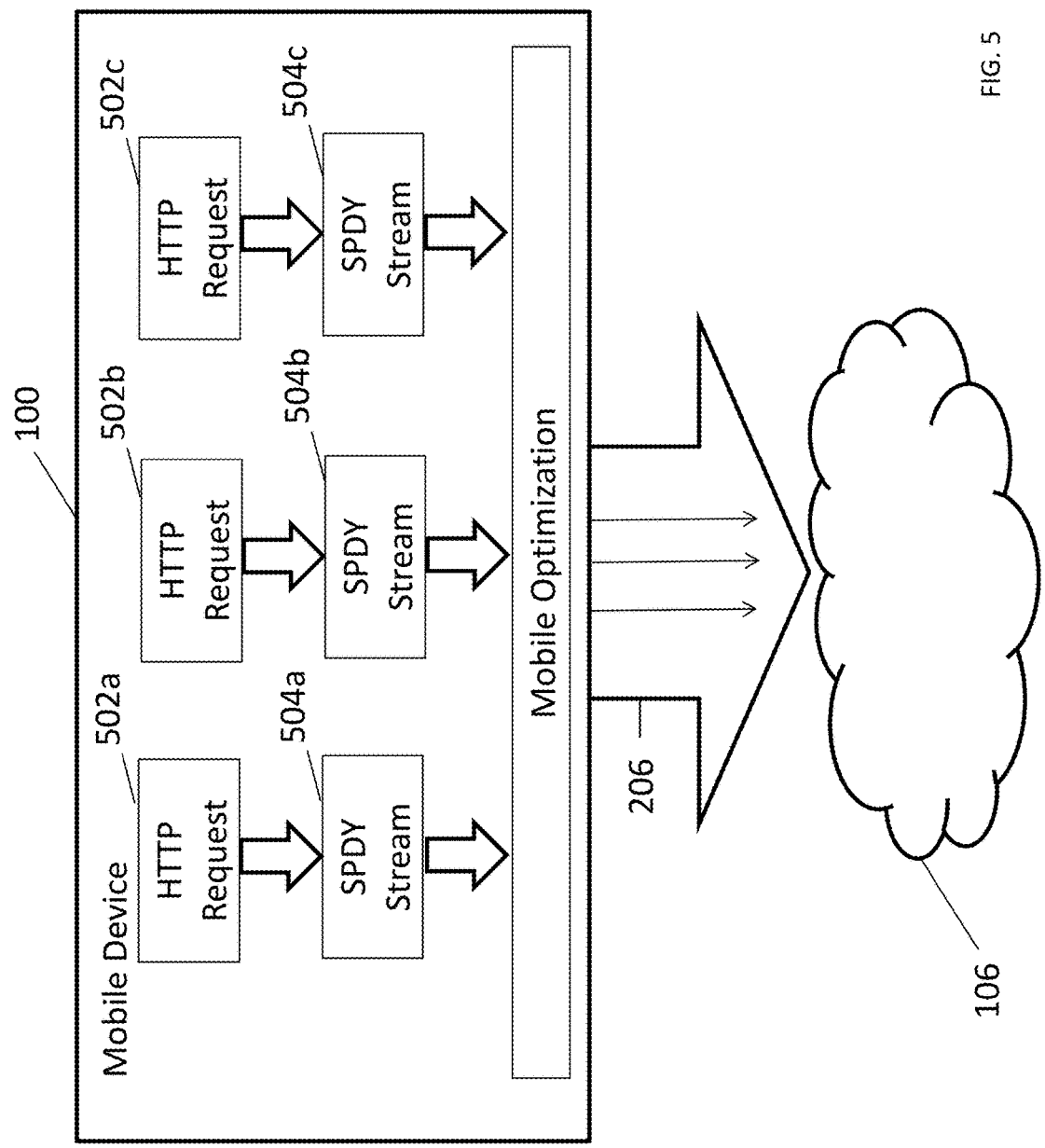
FIG. 5 illustrates an example relationship between several streams of a client application and a single network association, in accordance with some embodiments.

FIG. 5 illustrates an example of a relationship between the individual requests created by a client application of a mobile device and the single association used to transmit data for those requests, in accordance with some embodiments. FIG. 5 includes mobile device 100, client HTTP requests 502a-502c, SPDY streams 504a-504c, client mobile optimization module 104, network 106, and network association 206.

As in the example of FIG. 4, client application 102d may initiate HTTP requests 502a-502c. Each of these HTTP requests may be mapped to a corresponding SPDY stream 504c-504c by client application 102d. These individual SPDY streams are each managed by client mobile optimization module 104, which executes locally on mobile device 100. Client mobile optimization module 104 dynamically maps each SPDY stream 504a-504c to one or more prioritized streams of network association 206. Traffic originating from or addressed to client application 102d corresponding to HTTP requests 502a-502c travels through network 106 using the network association 206. In some embodiments, each prioritized stream of network association 206 may be an SCTP stream, and the network association 206 may be an SCTP association. One or more such SCTP associations may be established with a headend network entity such as a router.

Figure 6:
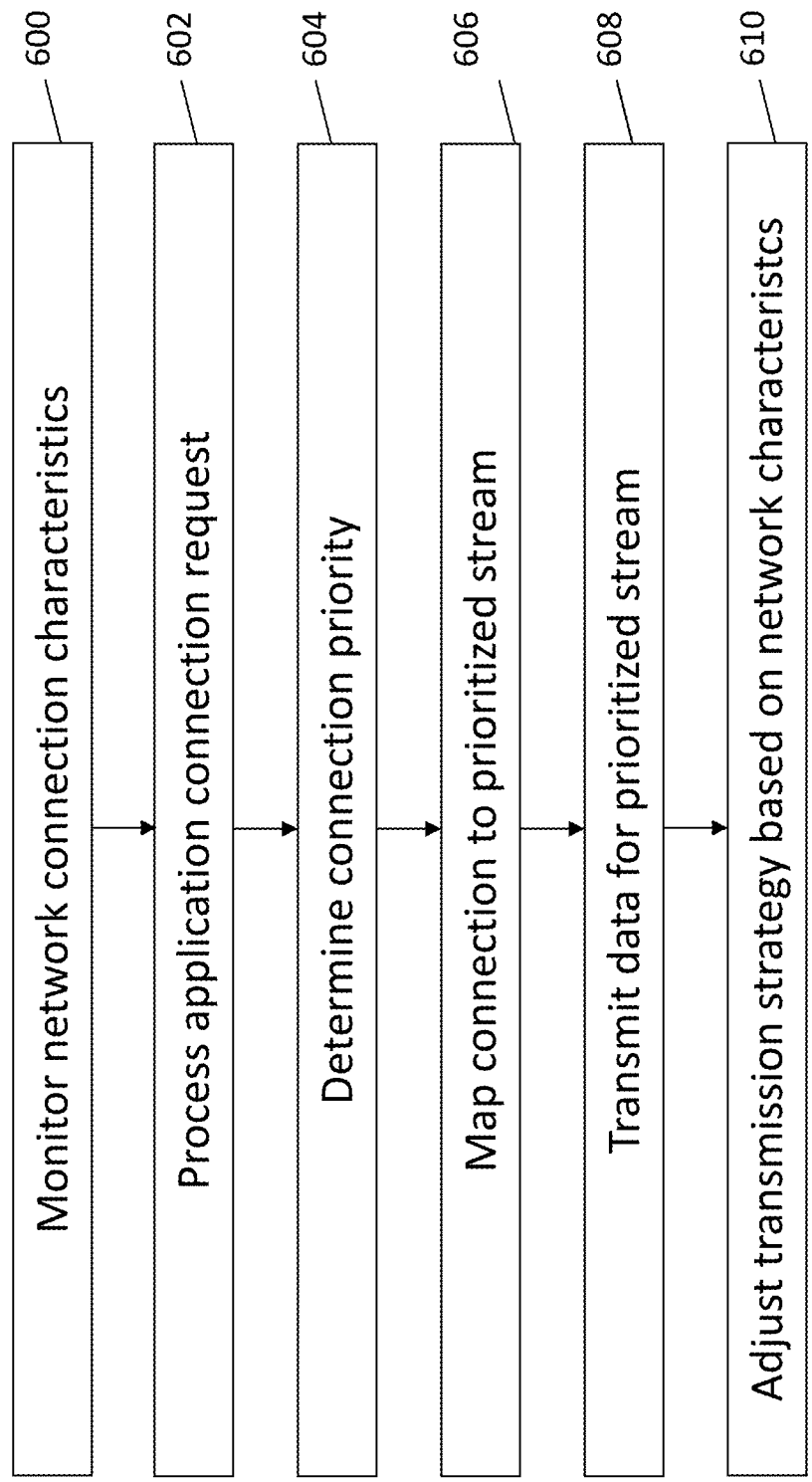
FIG. 6 is a flow chart illustrating a client-side method of optimizing the flow of mobile device messages, in accordance with some embodiments.

FIG. 6 illustrates a method of optimizing the flow of mobile device messages, in accordance with some embodiments. In step 600, the mobile device determines characteristics of its network connection. For example, a wireless mobile device may determine characteristics for its wireless link such as error rate, latency, bandwidth, signal strength, and interference. The mobile device may determine these characteristics by transmitting a probe message or messages to test the network. Alternatively, a network entity such as a router in communication with the mobile device over the network may provide information regarding characteristics of the network. Other methods of determining network characteristics known to those of skill in the art may also be used.

In step 602, the mobile device processes a connection request for an application. In some embodiments, this may be a request for a TCP connection, an HTTP request, or a SPDY stream request. The mobile device may be configured to detect any connection requests issued by any application or by certain applications and process them according to the following description.

In step 604, the mobile device determines a priority for the connection. This priority may be based on the specific application making the request, on the type of requesting application, on data extracted from connection traffic (e.g., a SPDY stream priority), or be provided by the requesting application. A combination of these and other factors may also be used to determine the priority of the connection request.

In step 606, the connection request is mapped to one or more prioritized streams with a priority based on the priority determined in step 604. Data transmitted or received by the application using the requested connection is carried across the network using the prioritized streams created in this step. In some embodiments, the streams may be SCTP streams. These and other prioritized streams may be managed by a network association (e.g., an SCTP association) established between mobile device and a headend network router.

In step 608, flow control and congestion control are applied to transmit data for the prioritized streams (those created in step 606 and other existing streams). For example, in favorable network conditions, data for the prioritized streams may be transmitted as soon as it is available from the client application. In less favorable network conditions, data for higher priority streams may be transmitted ahead of data from relatively lower priority streams. Under these conditions, data from the lower priority streams may be buffered at the client until network conditions improve or the higher priority streams have been given appropriate precedence. The network conditions and stream priorities may be periodically or continually revised, resulting in dynamic flow control and congestion control. The stream data may also be compressed prior to transmission over the network. In embodiments using SCTP streams, the flow control and congestion control may be implemented by controlling each SCTP stream using one or more SCTP associations between the mobile device and a headend network router.

In step 610, the mobile device may adjust its transmission strategy based on changing network conditions. The mobile device may continue to monitor network characteristics or receive such information from a network device such as a router. The mobile device may take this information into account when determining the flow control and congestion control to apply to existing and future streams. For example, if the mobile device detects that it has roamed from a 4G connection to a 2G connection, the mobile device may increase the degree of compression used on stream data or allocate relatively more of the available bandwidth to high priority streams.

Figure 7:
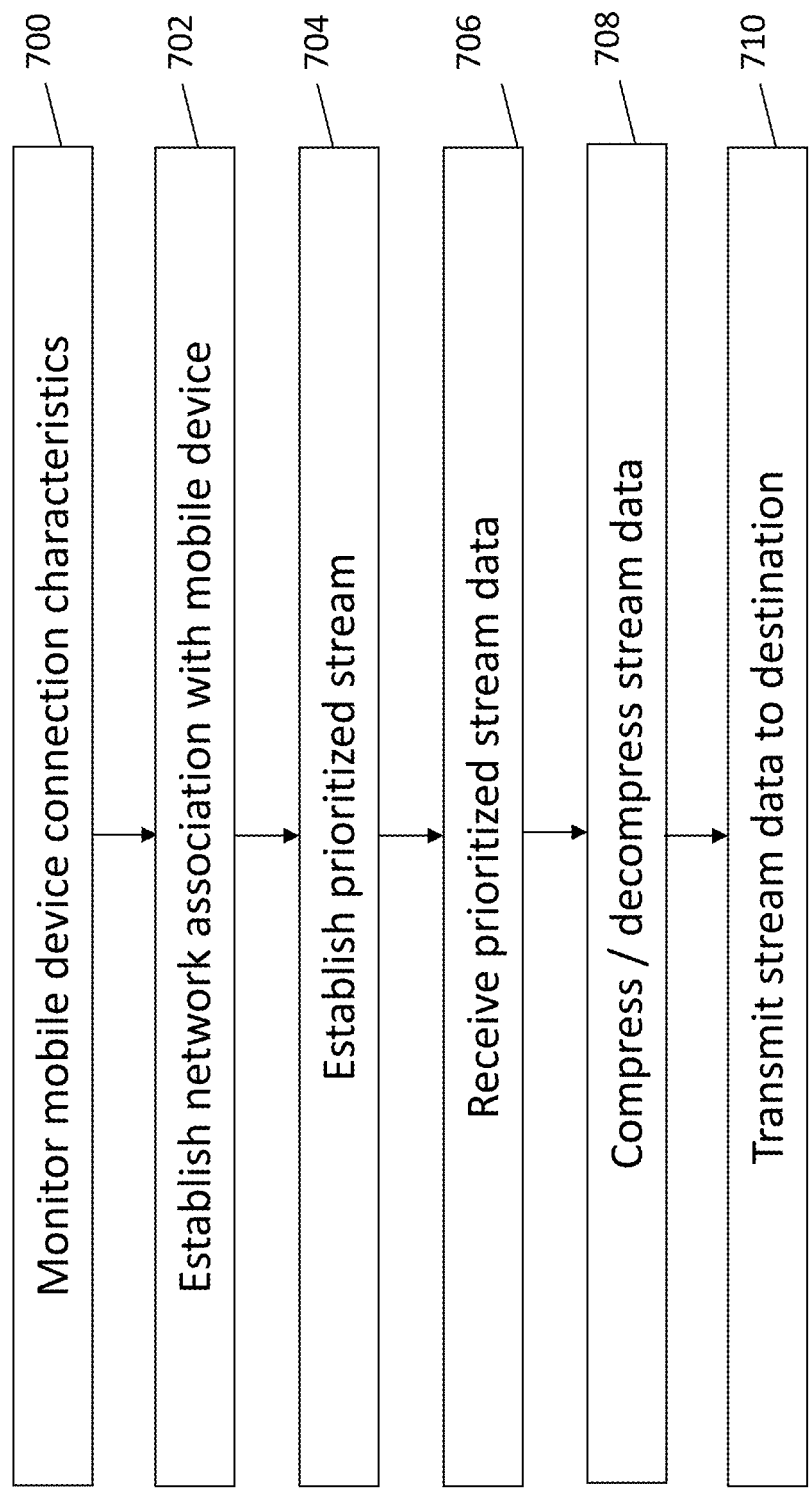
FIG. 7 is a flow chart illustrating a server-side method of optimizing the flow of mobile device messages, in accordance with some embodiments.

FIG. 7 illustrates a network-side method of facilitating the optimized flow of mobile device messages, in accordance with some embodiments. In some embodiments, this method may be implemented on a server or network router such as a CISCO cloud services router or a packet gateway (PGW) in a cellular network. In step 700, the server may monitor network characteristics and transmits these characteristics to one or more mobile devices. These characteristics may describe aggregate network performance, characteristics specific to a particular mobile device, or some combination of this information.

In step 702, the router establishes one or more network associations with a particular mobile device. This association is used to receive and transmit data for one or more streams of data originating from or addressed to that mobile device. For example, the association may be an SCTP association that is used to carry data for one or more SCTP streams. Each such SCTP stream may correspond to a TCP connection requested by an application running on the mobile device.

In step 704, the router establishes a prioritized stream to carry data to and from the mobile device. The creation of the prioritized stream may be initiated by the mobile device, by the router, or by another network node such as a destination server. In particular, this prioritized stream may be created in response to request for a network connection issued by a client application running on the mobile device. In this case, the router may also create a corresponding TCP connection to the destination server to which the connection requested was directed. For example, if a bank application requests a TCP connection to a bank server, the router may establish both a prioritized stream to carry data for the connection between the mobile device and the router, and also a TCP connection to carry the same data from the router to the bank server. In this way, the mobile application and the bank server are able to send and receive data in a prioritized manner, but do not need to be aware of the prioritized stream that is used between the mobile device and the router.

In step 706, the router receives data corresponding to a prioritized stream from the mobile device or from a destination server. In step 708, if the prioritized stream data was compressed by the mobile device, the router decompresses the data. Similarly, if the stream data from the destination server arrives at the router, and the mobile device is configured to decompress stream data, the router compresses the data. These steps of compression and decompression conserve network link bandwidth between the router and the mobile device. In step 710, the prioritized stream data is transmitted to the mobile device (if it originated from the destination server) or the destination server (if it originated from the mobile device). By these steps, the router acts as an intermediary between the mobile device and the destination server to facilitate the prioritized flow to and from the mobile device. The mobile device may be using an unreliable or slow wireless network connection, and so it is important to optimize traffic between these network nodes in particular.

Figure 8:
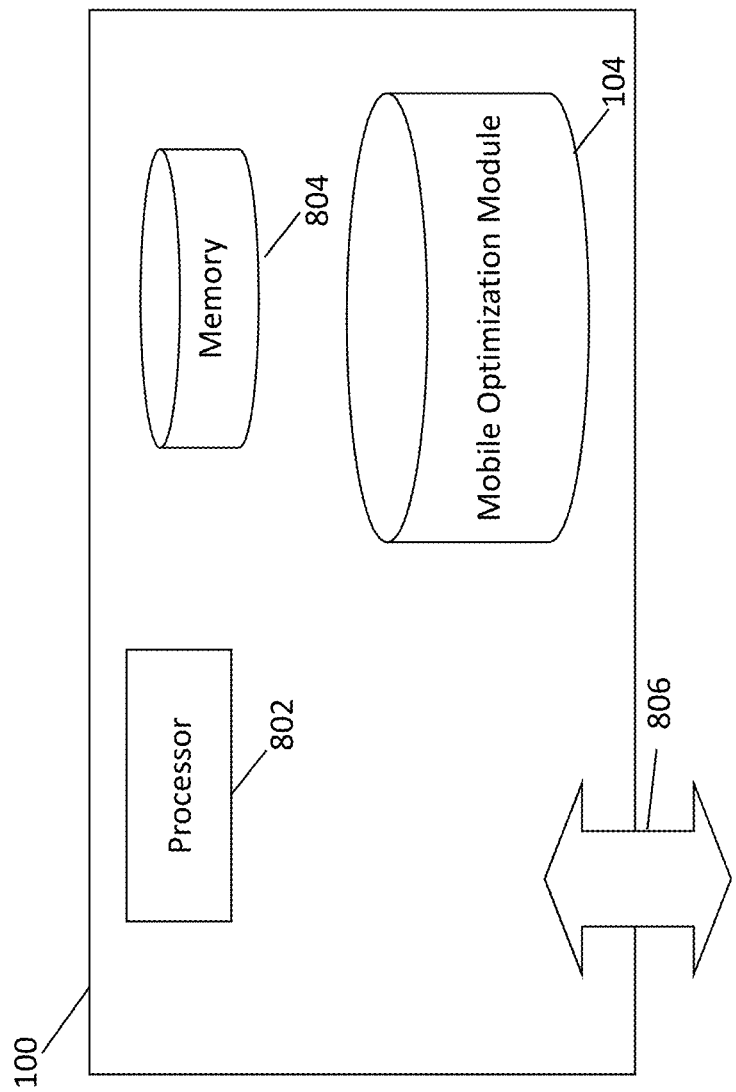
FIG. 8 illustrates a logical view of a mobile device, in accordance with some embodiments.

FIG. 8 illustrates a logical view of a mobile device 100, in accordance with some embodiments. The mobile device 100 may include one or more of a processor 802, a memory 804, a network interface 806, and a client mobile optimization module 104. Network interface 806 may provide an input and/or output mechanism to communicate with other network devices such as a router. The network interface 806 may also provide communication with, for example, other gateways, wireless access nodes, application servers to send and receive data such as packets and messages. The network interface 806 may be implemented in hardware to send and receive signals in a variety of mediums, such as optical, copper, and wireless, and in a number of different protocols some of which may be non-transient. The network interface 806 may provide connectivity to 3G, 4G, WiFi, or other network types. Processor 802 runs software which uses the network interface 806 and the memory 804 such as a tangible, non-transitory computer readable medium, a programmable read only memory (PROM), or flash memory. Processor 802 may be any computer chip that is capable of executing program instruction streams that are part of a software program. Processor 802 may have multiple cores for executing multiple streams of program instructions simultaneously. The processor 802 may also have multiple sub-processors which are optimized for executing particular categories of program instructions and are controlled by the processor 802. The memory 804 is capable of storing and retrieving program instructions, program data, or any other data that is used by the processor 802. The processor 802 may store and retrieve data from the memory 804 as a software program is executed. Memory 804 may include or store the client mobile optimization module 104. Memory 804 may also include associated policies and configurations. The processor 802 may access and update the client mobile optimization module and associated policies and configurations.

The user equipment (e.g., mobile device) described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The gateway (e.g., router) described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The gateway can be implemented as any combination of the following including an xGSN, an xGW, an xGW-SGW, and an xGW-PGW.

Figure 9:
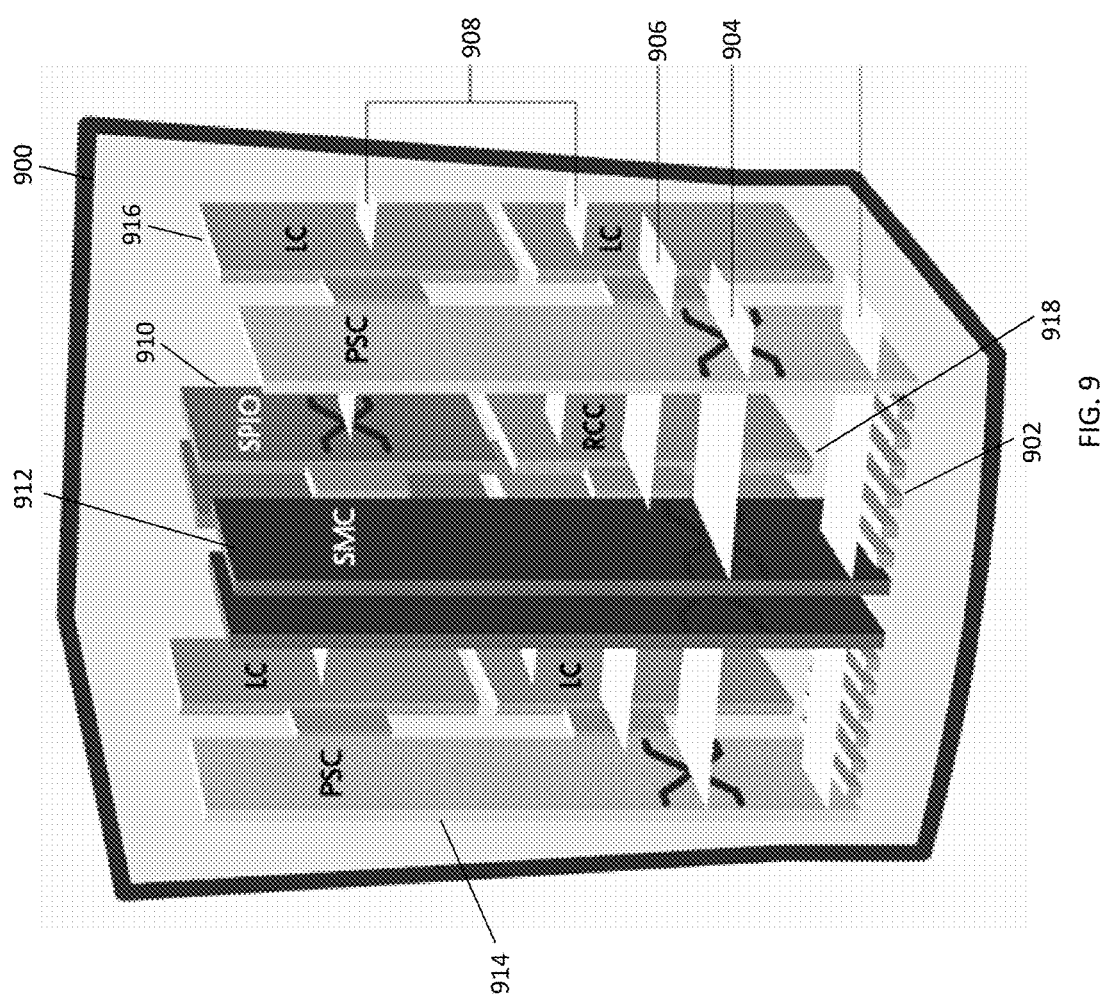
FIG. 9 illustrates a network device in accordance with some embodiments.

In some embodiments the network device or router is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 9 illustrates the implementation of a network device in accordance with some embodiments. The network device 900 includes slots 902 for loading application cards and line cards. A midplane can be used in the network device to provide intra-network device communications, power connections, and transport paths between the various installed cards. The midplane can include buses such as a switch fabric 904, a control bus 906, a system management bus, a redundancy bus 908, and a time division multiplex (TDM) bus. The switch fabric 904 is an IP-based transport path for user data throughout the network device implemented by establishing inter-card communications between application cards and line cards. The control bus 906 interconnects the control and management processors within the network device. The network device management bus provides management of system functions such as supplying power, monitoring temperatures, board status, data path errors, card resets, and other failover features. The redundancy bus 908 provides transportation of user data and redundancy links in the event of hardware failures. The TDM bus provides support for voice services on the system.

The network device supports at least four types of application cards: a switch processor I/O card (SPIO) 910, a system management card (SMC) 912, a packet service card (PSC) 914, and a packet accelerator card (not shown). Other cards used in the network device include line cards 916 and redundant crossbar cards (RCC) 918. The line cards 916, when loaded in the network device, provide input/output connectivity to the network and other devices, as well as redundancy connections. The line cards 916 include interfaces to the network through Ethernet, Fiber Optic, and the other communication mediums. The redundant crossbar card (RCC) 918 includes a non-blocking crossbar and connections to each of the cards in the network device. This allows a redundant connection to be made through the redundant crossbar card 918 from any one card to any other card in the network device. The SPIO card 910 serves as a controller of the network device and is responsible for such things as initializing the network device and loading software configurations onto other cards in the network device.

The system management card (SMC) 912 and switch processor card (not shown) are system control and management cards for managing and controlling other cards in the network device. The packet accelerator card (PAC) and packet service card (PSC) 914 provide packet processing, context processing capabilities, and forwarding capabilities among other things. The PAC and PSC 914 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 10:
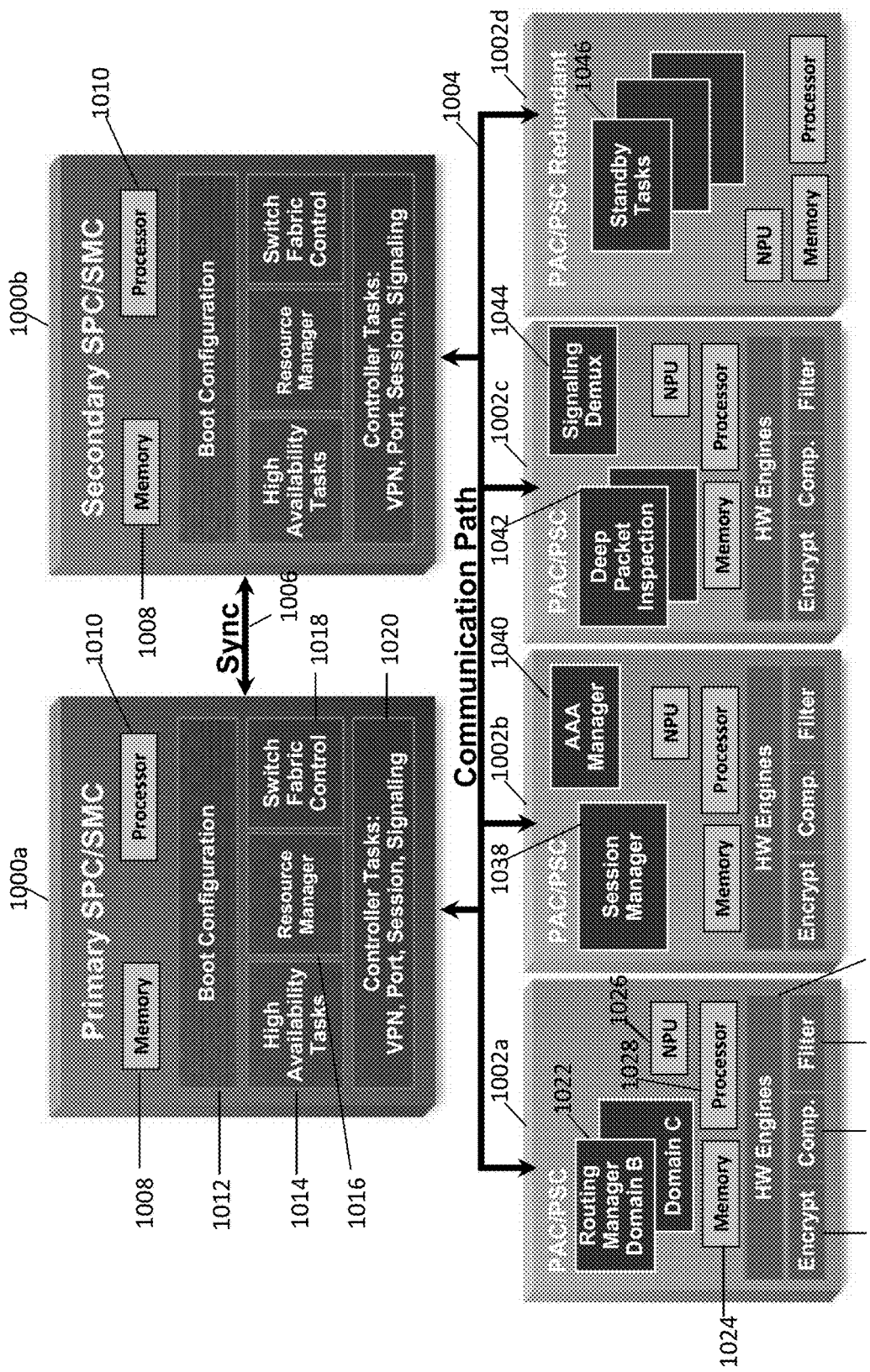
FIG. 10 illustrates a logical view of the software architecture of a network device in accordance with some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 10 illustrates a logical view of the software architecture of a network device or router in accordance with certain embodiments. As shown, the software and hardware can be distributed within the network device and across different circuit boards, processors, and memory. FIG. 10 includes a primary switch processor card (SPC)/system management card (SMC) 1000a, a secondary SPC/SMC 1000b, PAC/PSC 1002a-1002d, a communication path 1004, and a synchronization path 1006. The SPC/SMC 1000 include a memory 1008, a processor 1010, a boot configuration 1012, high availability tasks 1014, resource manager 1016, switch fabric control 1018, and controller tasks 1020.

The SPC/SMC 1000 manage and control the network device including the other cards in the network device. The SPC/SMC 1000 can be configured in a primary and secondary arrangement that provides redundancy and failsafe protection. The modules or tasks running on the SPC/SMC 1000 are related to network device wide control and management. The boot configuration task 1012 includes information for starting up and testing the network device. The network device can also be configured to startup in different configurations and providing different implementations. These can include which functionalities and services are capable of running on the SPC/SMC 1000. The high availability task 1014 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 1000 or a PAC/PSC 1002, while some processor intensive tasks can also be performed across multiple PACs/PSCs to utilize multiple CPU resources. Distribution of these tasks is invisible to the user. The switch fabric control 1018 controls the communication paths in the network device. The controller tasks module 1020 can manage the tasks among the resources of the networks to provide, for example, VPN services, assign ports, and create, delete, and modify sessions for user equipment.

The PAC/PSC 1002 are high-speed processing cards that are designed for packet processing and the tasks involved with providing various network functionalities on the network device. The PAC/PSC 1002 include a memory 1024, a network processing unit (NPU) 1026, a processor 1028, a hardware engine 1030, an encryption component 1032, a compression component 1034, and a filter component 1036. Hardware engines 1030 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 1002 is capable of supporting multiple contexts. The PAC/PSC 1002 are also capable of running a variety of tasks or modules. PAC/PSC 1002a provides routing managers 1022 with each covering routing of a different domain. PAC/PSC 1002b provides a session manager 1038 and an AAA manager 1040. The session manager 1038 manages one or more sessions that correspond to one or more user equipment. A session allows a user equipment to communicate with the network for voice calls and data. The AAA manager 1040 manages accounting, authentication, and authorization with an AAA server in the network. PAC/PSC 1002 provides a deep packet inspection task 1042 and a signaling demux 1044. The deep packet inspection task 1042 provides inspection of packet information beyond layer 4 for use and analysis by the network device. The signaling demux 1044 can provide scalability of services in combination with other modules. PAC/PSC 1002d provides redundancy through standby tasks 1046. Standby tasks 1046 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, router functionality can be combined or co-located with a MME or SGSN.

We claim:
1. A method comprising:
monitoring a wireless network link of a mobile device to determine at least one performance characteristic of the wireless network link;
using the wireless network link, establishing a network association between the mobile device and a routing network node;
detecting, by the mobile device, a first connection request from a first application of the mobile device, wherein the first connection request is directed to a first connection between the mobile device and a first uniform resource identifier (URI) of a first destination server accessible via the wireless network link;
detecting, by the mobile device, a second connection request from a second application of the mobile device, wherein the second connection request is directed to a second connection between the mobile device and a second URI of a second destination server accessible via the wireless network link;
determining, by the mobile device based on a text of a regular expression that matches the first and second URIs, that a relative priority of the first connection is greater than a relative priority of the second connection;
mapping, by the mobile device, the first connection to a first stream of the network association and the second connection to a second stream of the network association;
interlacing, by the mobile device, messages of the first connection with messages of the second connection within the network association, wherein the mobile device determines the order of the interlaced messages based on the relative priority of the first connection, the relative priority of the second connection, and the determined at least one performance characteristic of the wireless network link, wherein the determined order of the interlaced messages orders a first packet of the first application ahead of a second packet of the second application based on the relative priority of the first connection being greater than the relative priority of the second connection; and
transmitting, by the mobile device, the interlaced messages to the routing network node over the wireless network link using the network association.

2. The method of claim 1, further comprising periodically monitoring the wireless network link to update the at least one performance characteristic of the wireless network link, wherein the at least one performance characteristic is affected by a wireless network link condition, wherein the wireless network link condition comprises one or more of: (i) interference, (ii) environmental conditions, (iii) terrestrial obstructions, (iv) reflection, and (v) handoffs of the wireless network link from the routing network node to a different routing network node, wherein the relative priorities of the first and second connections are further based on a type of the first and second applications, respectively, wherein the respective types of the first and second applications are determined based on: (i) the first and second URIs, (ii) a respective application programming interface (API) used by the first and second applications, (iii) a policy received from the routing network node.

3. The method of claim 2, wherein monitoring the wireless network link of the mobile device to determine the at least one performance characteristic of the wireless network link includes receiving at least a portion of the at least one performance characteristic from the routing network node.

4. The method of claim 1, further comprising mapping a third connection generated by a third application of the mobile device to a plurality of streams of the network association, wherein each stream of the plurality of streams is used to carry a category of messages of the third connection.

5. The method of claim 4, wherein the third connection includes a plurality of SPDY streams.

6. The method of claim 1, further comprising compressing the messages of the first connection prior to transmitting the messages of the first connection to the routing network node.

7. The method of claim 1, wherein the network association includes a SCTP association and each stream of the network association is a SCTP stream.

8. A mobile device comprising:
one or more interfaces configured to communicate with a routing network node using a wireless network link; and
a processor to execute stored instructions to perform an operation comprising:
monitoring the wireless network link to determine at least one performance characteristic of the wireless network link;
using the wireless network link, establish a network association between the mobile device and a router;
detecting a first connection request from a first application of the mobile device, wherein the first connection request is directed to a first connection between the mobile device and a first uniform resource identifier (URI) of a first destination server accessible via the wireless network link;
detecting a second connection request from a second application of the mobile device, wherein the second connection request is directed to a second connection between the mobile device and a second URI of a second destination server accessible via the wireless network link;
determining, based on a text of a regular expression that matches the first and second URIs, that a relative priority of the first connection is greater than a relative priority of the second connection;
mapping the first connection to a first stream of the network association and the second connection to a second stream of the network association, wherein the stream is associated with the relative priority of the connection and identifies the destination server;
interlacing messages of the first connection with messages of the second connection within the network association, wherein the mobile device determines the order of the interlaced messages based on the relative priority of the first connection, the relative priority of the second connection, and the determined at least one performance characteristic of the wireless network link, wherein the determined order of the interlaced messages orders a first packet of the first application ahead of a second packet of the second application based on the relative priority of the first connection being greater than the relative priority of the second connection; and
transmitting the interlaced messages to the router over the wireless network link using the network association.

9. The mobile device of claim 8, the operation further comprising periodically monitoring the wireless network link to update the at least one performance characteristics characteristic of the network link, wherein the at least one performance characteristic is affected by a wireless network link condition, wherein the wireless network link condition comprises one or more of: (i) interference, (ii) environmental conditions, (iii) terrestrial obstructions, (iv) reflection, and (v) handoffs of the wireless network link from the routing network node to a different routing network node, wherein the relative priorities of the first and second connections are further based on a type of the first and second applications, respectively, wherein the respective types of the first and second applications are determined based on: (i) the first and second URIs, (ii) a respective application programming interface (API) used by the first and second applications, (iii) a policy received from the routing network node.

10. The mobile device of claim 9, wherein monitoring the wireless network link of the mobile device to determine the at least one performance characteristic of the network link includes receiving at least a portion of the at least one performance characteristic from the router.

11. The mobile device of claim 8, the operation further comprising mapping a third connection generated by a third application of the mobile device to a plurality of streams of the network association, wherein each stream of the plurality of streams is used to carry a category of messages of the third connection.

12. The mobile device of claim 11, wherein the third connection includes a plurality of SPDY streams.

13. The mobile device of claim 8, the operation further comprising assigning a proportion of the network association to the first stream based on the determined at least one performance characteristic of the wireless network link.

14. The mobile device of claim 13, the operation further comprising adjusting the proportion of the network association assigned to the first stream in response to a change in the at least one performance characteristic of the wireless network link.

15. The mobile device of claim 8, wherein the first stream of the network association comprises data originating from the first application and a second stream of the network association comprises data originating from the second application, the second application distinct from the first application.

16. The mobile device of claim 15, wherein the first application comprises a file transfer protocol (FTP) client and the second application comprises an online banking application.

17. The mobile device of claim 8, the operation further comprising compressing the messages of the first connection prior to transmitting the messages of the first connection to the router.

18. The mobile device of claim 8, wherein the network association includes a SCTP association and each stream of the network association is a SCTP stream.

19. The mobile device of claim 8, the operation further comprising determininq the relative priority of the first connection by accessing a priority assigned to the first application by a user of the mobile device and to determine the relative priority of the second connection by accessing a priority assigned to the second application by the user.

20. The mobile device of claim 8, wherein the first connection is a Transmission Control Protocol (TCP) connection.

21. The mobile device of claim 8, wherein the ordering of the messages interlaced within the network association is determined after the messages are designated for placement within the network association.

22. The mobile device of claim 8, the operation further comprising determining the bandwidth available to the mobile device and determine the order of the interlaced messages further based on the determined bandwidth.

23. The mobile device of claim 8, the operation further comprising:
allocating, to the first connection, a first proportion of a determined first bandwidth of the mobile device; and
in response to determining a second bandwidth of the mobile device, allocating, to the first connection, a second proportion of the determined second bandwidth, wherein the first bandwidth is higher than the second bandwidth and the first proportion is smaller than the second proportion.

24. The mobile device of claim 8, to the operation further comprising increaseing a proportion of the network association that is dedicated to messages of the first connection in response to a determination that the performance characteristics of the wireless network have worsened.

25. A non-transitory computer-readable storage medium having computer-readable code embodied therewith, the computer-readable program code executable by a processor to perform an operation comprising:
monitoring a wireless network link of a mobile device to determine at least one performance characteristic of the wireless network link;
using the wireless network link, establishing a network association between the mobile device and a routing network node;
detecting a first connection request from a first application of the mobile device, wherein the first connection request is directed to a first connection between the mobile device and a first uniform resource identifier (URI) of a first destination server accessible via the wireless network link;
detecting a second connection request from a second application of the mobile device, wherein the second connection request is directed to a second connection between the mobile device and a second URI of a second destination server accessible via the wireless network link;
determining, based on a text of a regular expression that matches the first and second URIs, that a relative priority of the first connection is greater than a relative priority of the second connection;
mapping the first connection to a first stream of the network association and the second connection to a second stream of the network association;
interlacing messages of the first connection with messages of the second connection within the network association, wherein the mobile device determines the order of the interlaced messages based on the relative priority of the first connection, the relative priority of the second connection, and the determined at least one performance characteristic of the wireless network link, wherein the determined order of the interlaced messages orders a first packet of the first application ahead of a second packet of the second application based on the relative priority of the first connection being greater than the relative priority of the second connection; and
transmitting the interlaced messages to the routing network node over the wireless network link using the network association.

26. The computer-readable storage medium of claim 25, the operation further comprising periodically monitoring the wireless network link to update the at least one performance characteristic of the wireless network link, wherein the at least one performance characteristic is affected by a wireless network link condition, wherein the wireless network link condition comprises one or more of: (i) interference, (ii) environmental conditions, (iii) terrestrial obstructions, (iv) reflection, and (v) handoffs of the wireless network link from the routing network node to a different routing network node, wherein the relative priorities of the first and second connections are further based on a type of the first and second applications, respectively, wherein the respective types of the first and second applications are determined based on: (i) the first and second URIs, (ii) a respective application programming interface (API) used by the first and second applications, (iii) a policy received from the routing network node.

27. The computer-readable storage medium of claim 26, wherein monitoring the wireless network link of the mobile device to determine the at least one performance characteristic of the wireless network link includes receiving at least a portion of the at least one performance characteristic from the routing network node.

28. The computer-readable storage medium of claim 25, further comprising compressing the messages of the first connection prior to transmitting the messages of the first connection to the routing network node.

* * * * *

UNITED STATES PATENT AND TRADEMARK OFFICE
CERTIFICATE OF CORRECTION

| | | |
|---|---|---|
| PATENT NO. | : 10,104,704 B2 | Page 1 of 1 |
| APPLICATION NO. | : 14/175079 | |
| DATED | : October 16, 2018 | |
| INVENTOR(S) | : Shivangi Sharma et al. | |

It is certified that error appears in the above-identified patent and that said Letters Patent is hereby corrected as shown below:

In the Drawings

On sheet 6 of 10, in Figure 6, reference numeral 610, Line 1, delete "characteristcs" and insert -- characteristics --, therefor.

In the Specification

In Column 3, Line 3, delete "link)" and insert -- link). --, therefor.

In Column 18, Line 12, delete "A 10/A11" and insert -- A10/A11 --, therefor.

In the Claims

In Column 22, Lines 10-11, in Claim 9, delete "characteristics characteristic" and insert -- characteristic --, therefor.

In Column 22, Line 66, in Claim 19, delete "determininq" and insert -- determining --, therefor.

In Column 23, Line 25, in Claim 24, delete "to the" and insert -- the --, therefor.

In Column 23, Line 26, in Claim 24, delete "increaseing" and insert -- increasing --, therefor.

Signed and Sealed this
Nineteenth Day of March, 2019

Andrei Iancu
*Director of the United States Patent and Trademark Office*